United States Patent [19]

Papadopoulos

[11] 4,280,605

[45] Jul. 28, 1981

[54] AUTOMATICALLY LOCKING BRAKE ASSEMBLY

[76] Inventor: George Papadopoulos, Rua Visonte De Piraza, 284 Apt. 701, Ipanama, Rio De Janeiro, Brazil

[21] Appl. No.: 63,161

[22] Filed: Aug. 2, 1979

[51] Int. Cl.$^3$ ............................................. B60K 41/20
[52] U.S. Cl. ................................... 192/8 R; 188/72.7
[58] Field of Search .................. 192/8 R, 15, 17 R, 7, 192/4 R, 12 R; 188/72.7

[56] References Cited

U.S. PATENT DOCUMENTS

| 2,509,541 | 5/1950 | Suska | 192/8 R |
|---|---|---|---|
| 3,285,377 | 11/1966 | Rasmussen | 192/8 R |
| 3,627,087 | 12/1971 | Eskridge | 192/8 R |

Primary Examiner—George H. Krizmanich
Attorney, Agent, or Firm—Lockwood, Dewey, Alex, & Cummings

[57] ABSTRACT

A clutch or brake assembly is disclosed for controlling the relative rotation between two rotary members. Wedge means are carried between a pair of facing cam plate surfaces by an axial core member. The wedge means are axially movable with respect to the core member but prevented from rotating about the core member. The wedge means extend beyond the ends of the core member but, when the cam surfaces are aligned, are spaced therefrom to permit relative rotation between cam surfaces and the core member. When the cam plates are moved out of alignment, the distance between them is less than the axial length of the wedge means, causing the wedge means to wedge tightly between the cam plates. Because the wedge means is prevented from rotating relative to the core member, when it is wedged or locked between the cam plates they are also prevented from rotating relative to the core member.

14 Claims, 6 Drawing Figures

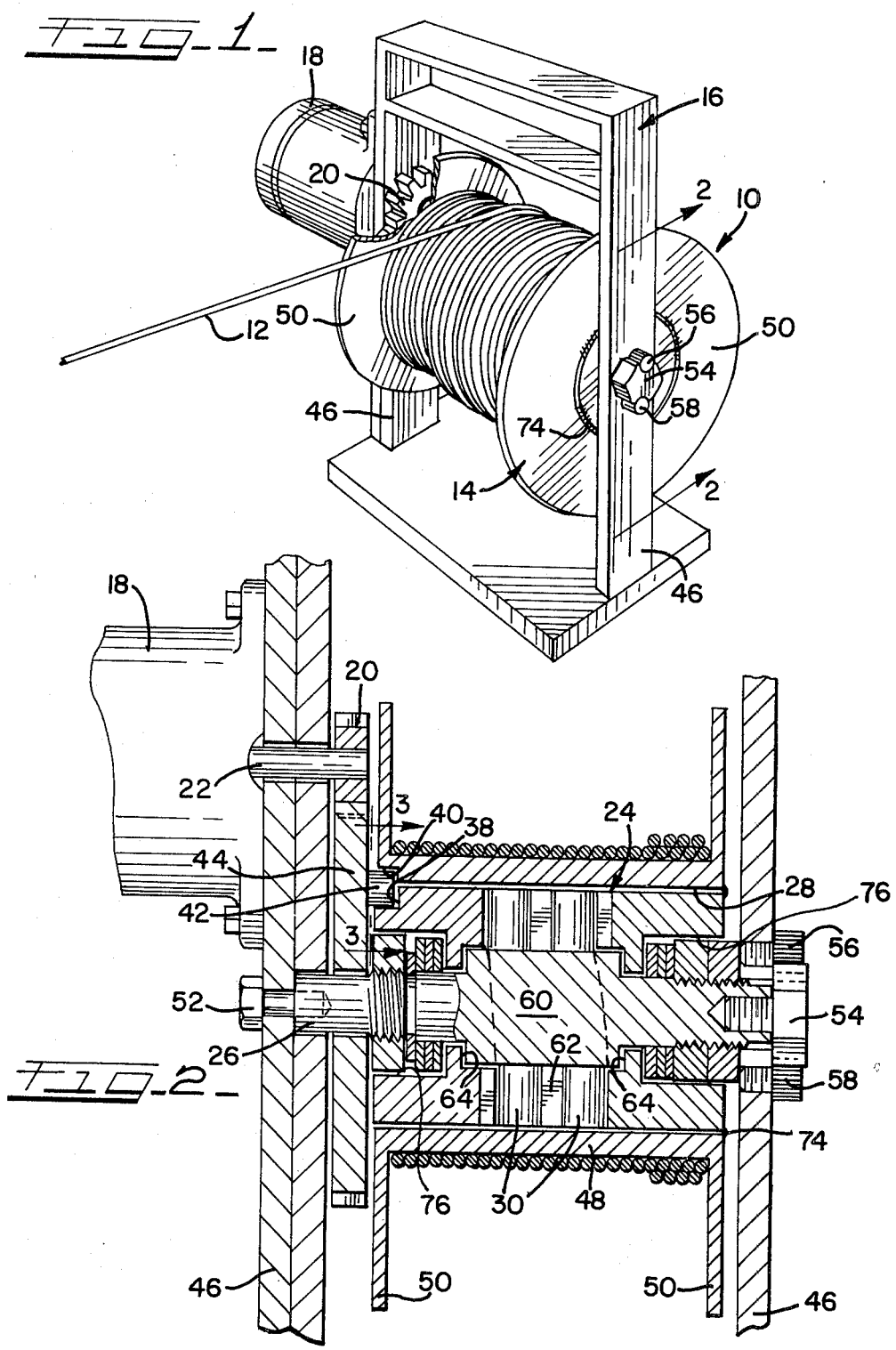

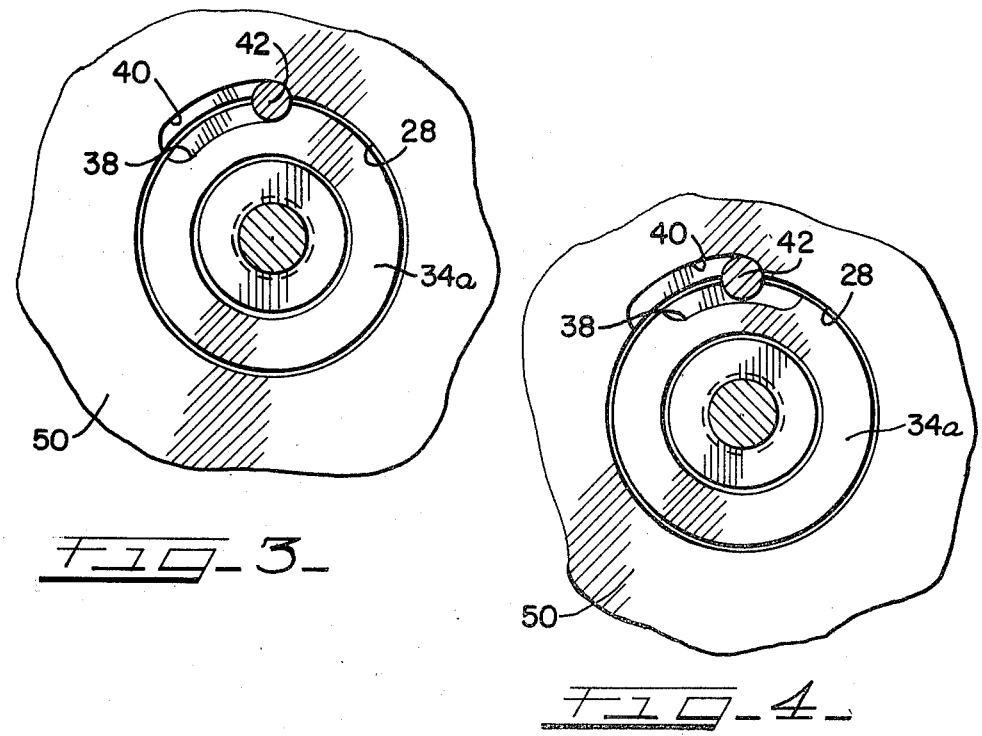
Fig-3.
Fig-4.
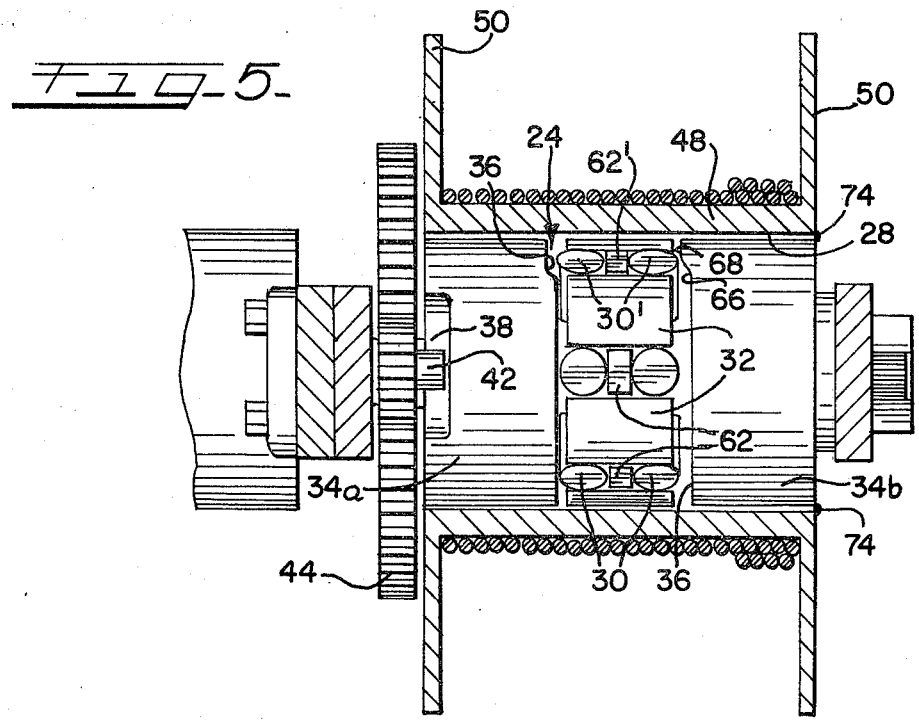
Fig-5.

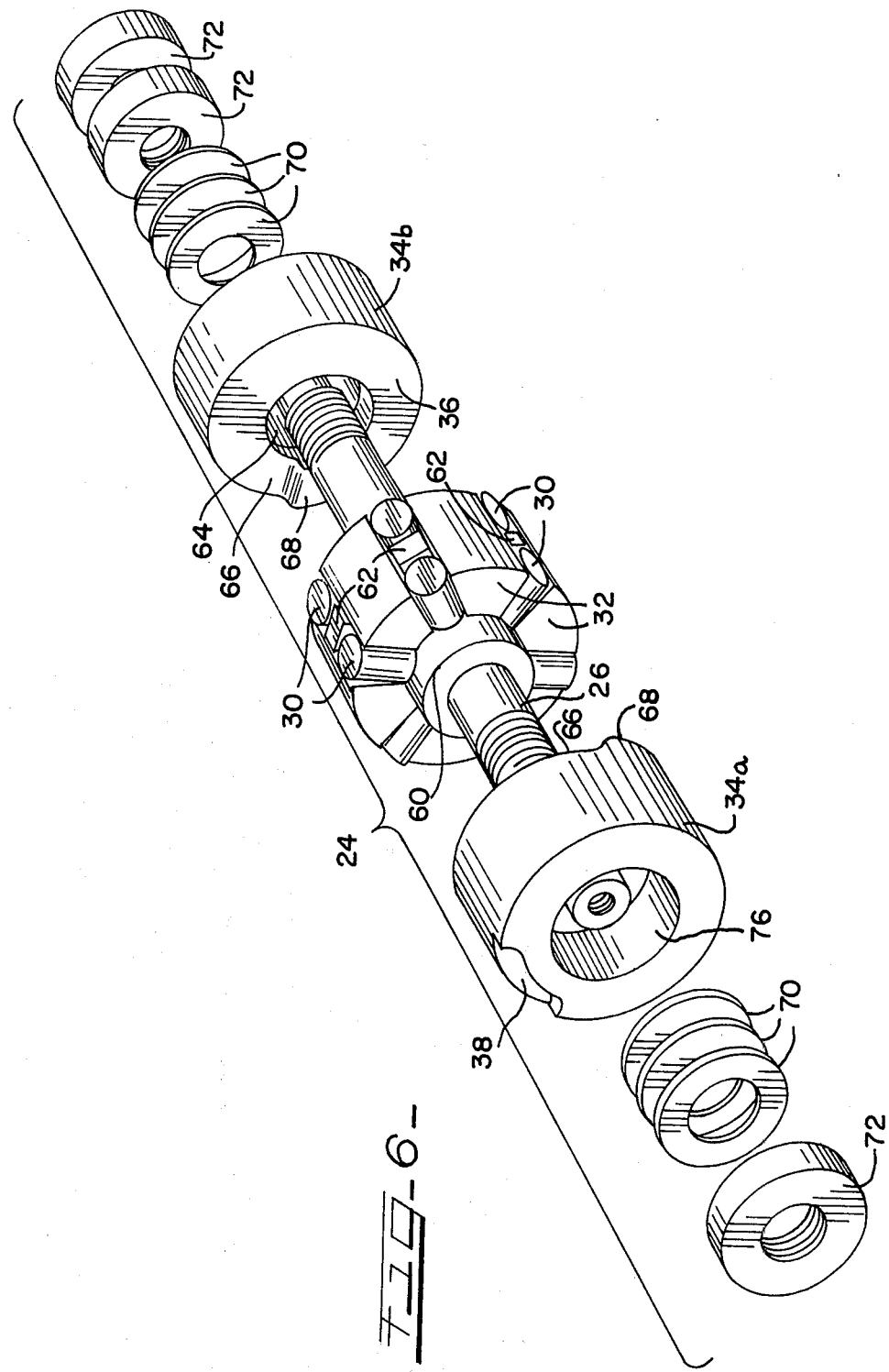

AUTOMATICALLY LOCKING BRAKE ASSEMBLY

The present invention relates generally to mechanical clutch or brake assemblies to control the relative rotation between two members or shafts. More particularly, it relates to such clutch or brake assemblies useful in winches or the like which require an automatic braking feature to prevent accidental release.

Winches are used in innumerable applications such as elevators, cranes, capstans, and the like. They may be mechanically or electrically driven and may be used in combination with a spool, drum or hub for retrieving and storing line or with a capstan for retrieving the line only. In most applications, it is desirable that a clutch assembly used in controlling the winch be easy to operate, reliable, and durable. In addition, it is desirable and sometimes mandatory that the clutch assembly have an automatically locking feature to prevent accidental release or discharge of line from the winch in the event of drive motor failure.

Accordingly, it is an object of the present invention to provide a brake which is rugged and reliable, yet not unnecessarily complicated or difficult to operate and maintain.

It is a further object of the present invention to provide a brake assembly which may be used in a winch for operation in both forward and reverse directions, but automatically locks against movement in either direction in the event of drive motor failure.

It is a still further object of the present invention to provide such a brake assembly which is useful in combination with a line storage spool, capstan or the like.

These and other objects of the present invention are set forth in the following detailed description and the attached drawings, of which:

FIG. 1 is a perspective view of a winch employing the brake assembly of the present invention.

FIG. 2 is a vertical sectional view taken along line 2—2 of FIG. 1.

FIGS. 3 and 4 are vertical plan views, broken away from the remainder of the winch, taken along line 3—3 of FIG. 2, which respectively show the feature of the present invention for unlocking and locking the brake assembly.

FIG. 5 is a horizontal sectional view of the winch of FIG. 1, but with the brake assembly inside the hub of the winch in elevation.

FIG. 6 is an exploded perspective view of the brake assembly employed in the winch of FIG. 1.

As set forth in the attached drawings, which illustrate the present invention in its preferred embodiment for the purpose of illustration and not limitation, the present invention is generally embodied in a winch 10 for retrieving or releasing cable 12 from a rotating storage spool or drum 14. The winch is shown mounted in a bracket 16 for illustration purposes only. The actual mounting arrangement would, of course, depend on the particular usage to which the winch would be employed, e.g., in a crane, on board a ship, or in an elevator shaft. In the illustrated embodiment, the winch is driven by an electric motor 18 through a small rotary gear 20 mounted on the motor shaft 22.

In accordance with the present invention, a rugged but easy to operate brake assembly is provided, generally at 24, for controlling the rotation of the storage spool 14 in either direction and automatically rigidly locking the spool against further rotation when the drive motor fails or is otherwise de-energized, e.g., by a power failure, or when it is simply turned off. The brake assembly has an axial core member 26 mounted within a cylindrical bore 28 in the hub of the cable spool 14. Wedge means in the form of roller bearings 30 are carried in slots defined between spline members 32 which extend radially from and axially along the core member 26. The size of the roller bearings is determined so that they extend slightly beyond the end of each slot. The bearings 30 are permitted to slide axially within the slots but the spline members 32 prevent rotation of the bearing means relative to the axis of the core member 26. A pair of cam plates 34a and 34b are mounted on either side of the radially extending spline, and have facing cam surfaces 36 closely adjacent the ends of the spline members. The cam plates are spaced such that the distance between the cam surfaces 36, when the cam surfaces are aligned at a relative angular displacement of 180°, with the raised portion of one cam surface opposite the recessed portion of the other cam surface, leaves a small space between the cam surfaces and the edge of the roller bearings 30. However, when the cam plates 34 are rotated out of alignment, the spacing is such to tightly wedge the roller bearings between the facing cam surfaces to lock the cams against rotation relative to the core member. The cam plates are moved to the angularly aligned position (see FIGS. 3, 4, and 5) by aligning facing grooves 38 and 40 in the peripheral edges of the left cam plate 34a and the spool 14. A pin 42 attached to drive gear 44 extends into the slot defined between the grooves, and upon rotation of the drive gear in either direction, abuts and aligns the ends of the grooves. The right cam plate 34b is welded or otherwise fixed to the spool, so that when the ends of the grooves are aligned, the cam plates 34a and 34b are in the angularly aligned position. When the drive motor 18 is released, accidentally or intentionally, the cam plates 34 slip a small amount into an unaligned position, wedging the roller bearings between their faces and preventing rotation of both cam plates and the spool 14 relative to the core member 26.

Turning now to a more detailed description of the attached drawings, in the illustrated winch 10, the storage spool 14 is shown mounted between a pair of upstanding legs 46 of the bracket 16. As noted before, this mounting is for illustration only, and may vary depending on the particular application and environment in which the invention will be used. The cable spool 14 has a cylindrical hub portion 48 with upstanding radial flanges 50 at each end for retaining the cable 12 on the spool. The brake assembly 24 is enclosed within the axial cylindrical bore 28 through the spool hub. The core member 26 extends beyond each end of the spool and is attached to the upstanding legs 46 of the brackets 16. As shown in FIG. 2, the left end of the core member is drilled and threaded to receive a bolt 52 through one of the bracket legs 46. The other end of the core member is similarly threaded to receive a bolt 54 for attachment to the bracket 16. As best seen in FIGS. 1 and 2, the head of bolt 54 is locked against rotation relative to bracket by a pair of smaller lock bolts 56 and 58 which are threadedly attached to the bracket 16 and positioned within recesses in the enlarged head of the bolt 54. This arrangement results in the core member 26 being locked against rotation relative to the bracket.

As described briefly earlier, the brake assembly 10 is substantially enclosed within the bore 28 of the cable spool 14. FIG. 6 shows the core member 26 with the other elements of the brake assembly in an exploded perspective view. The core member 26 is generally elongated and cylindrical in shape. It is threaded at each end for assembly of the cam plates 34 and has an enlarged centrally located cylindrical portion 60 from which the spline members 32 extend. The core member is made of high strength steel, and the spline 32 are preferably of one-piece construction with the core member. The spline members extend both radially from and axially along the enlarged cylindrical portion 60. The spline members are pie-shaped in cross-section, diverging in a radial direction so that the slots formed between adjacent spline members are of substantially the same width at any radial position.

A pair of roller bearings 30 with a spacer 62 between them are positioned within each slot, with the axis of each roller bearing extending in a generally radial direction relative to the axis of the core member. The roller bearings and spacer are also made of high strength steel, preferably stainless steel, to withstand the crushing forces encountered when the bearings are wedged between the cam surfaces 36 to lock the winch against release of further cable. Of course, the number of roller bearings or spacers provided in each slot may be varied depending on the particular application.

The size of the roller bearings 30 and spacer 62 are determined in conjunction with the width and length of the slots defined between the spline members 32. The diameter of the roller bearing should be sufficiently smaller than the width of the slot so that the roller bearing can rotate relatively freely about its own axis within the slot. In addition, the roller bearings and spacer together should be of sufficient total length (measured along the axis of the core) so that the edge of the roller bearing on each end of the slot extends slightly beyond the end of each spline member. In other words, the diameters of the two roller bearings plus the thickness of the spacer should be somewhat larger than the length of the slot. The distance beyond the end of the slot which the roller bearings must extend, is relatively small and may be varied depending on the particular application. It is only necessary that the roller bearings extend beyond the slot sufficiently that they engage the cam surfaces 36 and that the cam surfaces preferably do not contact or rub against the ends of the spline members.

Each cam plate 34 is substantially cylindrical in shape and has a center drilled opening for positioning over one end of the core member 26. In the embodiment illustrated in FIG. 6, each cam plate has a facing recess 64 for over-fitting the end of the enlarged cylindrical portion 60 of the core member. The facing cam surfaces 36 of the core members are substantially identical, defining a substantially circular cam race track of continuously varying axial elevation. It will be noted, however, that the change in the cam surface elevation between the lowest point 66 and the highest point 68 is relatively abrupt, with only a very small angular rotation needed to move from one to the other, as compared to the gently sloping surface of the remainder of the cam race track. This causes the cam to lock very quickly, i.e., with very small angular rotation, when the cam plates are rotated out of alignment, and results in virtually no slippage of the clutch assembly when it moves from a release position to a lock position.

Each cam plate 34 is secured on the core member 26 by at least one threaded retaining nut 72 received on the threaded shaft portion of the core member 26 sufficiently tightly to hold the cam plates 34 firmly on the core member, but not so tightly as to prevent rotation of the cam plates relative to the core member. In the illustrated embodiment, the slip washers 70 are secured between the plates locking nuts and the cam to permit a tight locking of the cam plates on the core member while allowing relative rotation between them. Each cam plate also has a recess 76 on its outer surface for flushly receiving the washers and retaining nuts 72. The cam plate 34b is shown with two retaining nuts 72, the outermost nut being a lock nut to prevent accidental loosening of the innermost retaining nut. Referring briefly to FIG. 2, a lock nut is not required for the other retaining nut because the drive gear 44 prevents accidental loosening.

Except for the end portions of the core member 26, the entire assembly shown in FIG. 6 is mounted within the bore 28 in the hub of the cable spool 14, with the outside surfaces of the cam plates 34 flush with the ends of the spool. To control the rotation of the spool, the cam plate 34b is rigidly attached to the spool, as by welding 74 or the like. Movement of the cam plates into the angularly aligned position to release the spool for unwinding cable is achieved by employing a driven pin 42 to align the ends of facing grooves 38 and 40 in the outer peripheral edge of the cam plate 34a and the inside peripheral edge of the bore 28, respectively. This is perhaps best seen in FIGS. 2, 3, and 4. The pin 42 is rigidly attached to the drive gear 44 that is driven by the winch motor 18 and the smaller rotary gear 20, although a hand crank or other means could be used. The pin 42 resides in a slot that is defined by the two facing cam and spool grooves 38 and 40. The cam plate 34b is welded to the spool 14 in the proper angular position relative to the slot 40 so that when the ends of the grooves between the spool and cam plate 34a are aligned, the cam plates will be in the angularly aligned position which permits rotation of the cam plates, and thus the spool, relative to the axial core member 26. Whether the drive motor 18 is moving in a forward direction or a reverse direction, movement of the pin within the slot causes alignment of the ends of the grooves thus releasing the spool for either winding or unwinding cable. If the motor fails for any mechanical reason, so that the pin is not forcing the ends of the facing grooves into alignment, tension on the cable 12 causes the spool 34b to immediately move out of the angularly aligned position (see FIG. 4). When this happens, the spacing between the cam surfaces 36 is less than the sum of bearing diameters and spacer width, resulting in at least one set of roller bearings and spacer being wedged tightly between the cam surfaces, locking them and the spool against rotation relative to the core member 26. Since the core member is fixed relative to the bracket, rotation of the spool is also prevented relative to the bracket.

Referring, for example to FIG. 5, which shows the brake assembly in the lock position, as soon as the cam plates have shifted out of angular alignment, the uppermost set of roller bearings and spacer designated 30' prime and 62' prime, are locked between the different elevations of the cam surfaces. To aid in visualizing the operation of this clutch assembly, it may be helpful to appreciate that when the cam surfaces are angularly aligned, and the cam plates 34 and spool 14 are rotating relative to the core member 26, the roller bearings and spacer are actually oscillating back and forth axially within the slots, riding on the cam surface 36 of one or both of the cam plates. Because the width of the slots permits the roller bearings 30 to rotate about their own axis, engagement between the cam race surface and the roller bearings causes the roller bearings to spin as they oscillate, which results in significantly less friction loss than a simple surface to surface sliding contact. It should be noted that although lubrication of the bearings and spacer would further help to reduce friction, it does not adversely affect the locking action of the brake assembly which is caused by tightly wedging the roller bearings and spacer between the cam surfaces.

In summary, the present invention provides a surprisingly unique and effective brake assembly for controlling the relative rotation between two rotary members, for example in a winch, with a simple, secure and rigid locking feature for preventing accidental release should a drive motor or the like fail. Although the present invention has been described in terms of the preferred embodiments, it is understood that the present invention, as set forth in the following claims, is also intended to include those equivalent structures, some of which may be obvious upon reading of this specification and others of which may become apparent only after some study.

What is claimed is:

1. A brake assembly comprising:
axial core;
wedge means carried by said core and fixed against rotation relative to said core means but movable axially with respect to said core means;
cam means defining a pair of substantially identical cam surfaces axially carried on either side of said wedge means, said cam surfaces being rotatable relative to said core means and to one another;
means for rotating said cam surfaces between a first angularly aligned position where the axial distance between the facing cam plate surfaces is substantially the same at all angular positions, and a second position out of angular alignment, said axial distance in the aligned position being greater than the axial length of said wedge means to permit relative rotation between said cam surfaces and said core means, said axial distance in the unaligned position being less than the axial length of said wedge means to wedge said wedge means between said cam surfaces whereby rotation of said cam surfaces relative to said core means is prevented.

2. A brake assembly in accordance with claim 1 wherein said axial core means comprises a plurality of radially and axially extending spline members defining a slot between adjacent spline members, said wedge means being disposed within said slot.

3. A brake assembly in accordance with claim 2 wherein said wedge means comprises at least one radially extending roller bearing.

4. A brake assembly in accordance with claim 1 wherein said wedge means comprises at least one radially extending roller bearing at each end of said slot.

5. A brake assembly in accordance with claim 4 wherein said wedge means consists of a pair of axially extending roller bearings with a spacer therebetween disposed within each of said slots.

6. A brake assembly in accordance with claim 1 wherein selected one of said axial core means and one of said cam surfaces is locked against rotational movement.

7. A brake assembly in accordance with claim 1 wherein said cam means comprises a pair of circular cam plates mounted axially with respect to said core means.

8. A brake assembly in accordance with claim 1 wherein said core means comprises a plurality of radially and axially extending spline members defining axially extending opening means between each pair of spline members, said wedge means being disposed within said opening means.

9. A brake assembly in accordance with claim 8 wherein said wedge means comprises a plurality of radially extending roller bearings disposed within each of said slots.

10. A brake assembly in accordance with claim 1 wherein said means for rotating said cam surfaces comprises a rigid member fixed to one of said cam surfaces and extending to adjacent the other of said cam surfaces, adjacent edge portions of said rigid member and said other cam surface having facing grooves together defining a slot therebetween, the ends of said grooves being aligned when said cam plate surfaces are in the angularly aligned position, the ends of said grooves being out of alignment when said cam plate surfaces are out of alignment, and means including a pin protruding into said slot for moving the end surfaces into alignment, thus moving cam surfaces into alignment to free the clutch for rotation, movement of said pin away from the ends of said grooves permitting rotation of said cam surfaces out of alignment to lock said cam surfaces against rotation relative to said core means.

11. A brake assembly comprising a winding spool with a cylindrical bore extending axially therethrough and an axial core member carried within said bore and including a plurality of the radially and axially extending spline defining opening means between adjacent spline, a first cam plate axially mounted over one end of said core member and fixed to said spool, a second cam plate axially mounted on the other end of said core member adjacent one end of said spool, wedge means disposed within each of said opening means and having an axial length greater than the axial length of said opening means to extend beyond the ends thereof, each of said cam plates having a cam surface adjacent the ends of said opening means, said cam plates being relatively rotatable between a first angularly aligned position where the axial distance between the facing cam plate surfaces is substantially the same at any angular location, and a second position out of angular alignment, said axial distance in the aligned position being greater than the axial length of said wedge means, said axial distance in the unaligned position being less than the axial length of said wedge means so that said wedge means are wedged tightly between said cam plates when they are out of alignment, said second cam plate having a peripheral groove, said one end of said spool bore also having a peripheral groove, said grooves facing each other to define a slot between them, said cam plates being disposed so that they are in the angularly aligned position when the ends of said grooves are aligned, means including a pin extending into said slot said pin being drivable within said slot to align the ends of said grooves to cause angular alignment of said cam plates, said pin being movable away from the end of said grooves to permit angular misalignment which automatically locks the said cam plates and spool against rotation relative to said core member.

12. A brake assembly in accordance with claim 11 wherein said pin is carried on a gear axially mounted on the end of said core member, and further comprising means for turning said gear to drive said pin against the ends of said grooves to align said ends to release said clutch for relative movement between said cam plates and said core member.

13. A brake assembly in accordance with claim 11 wherein said core member is locked against rotational movement so that the locking and unlocking of the clutch assembly either permits or prevents rotation of said spool.

14. A brake assembly in accordance with claim 11 wherein said opening means are slots and said wedge means comprises a plurality of radially extending roller bearings carried within each of said slots.

* * * * *